April 6, 1965  W. NESSELBERGER  3,176,798
VEHICLE WHEEL CHECK MEANS
Original Filed Nov. 1, 1962  5 Sheets-Sheet 1
Fig.1
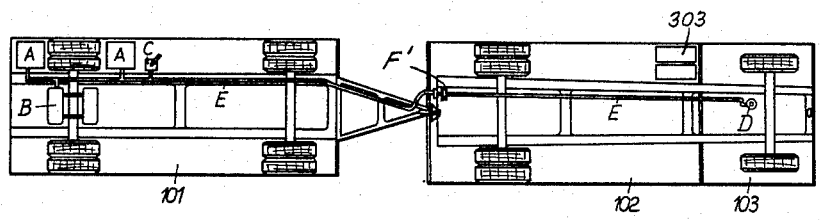
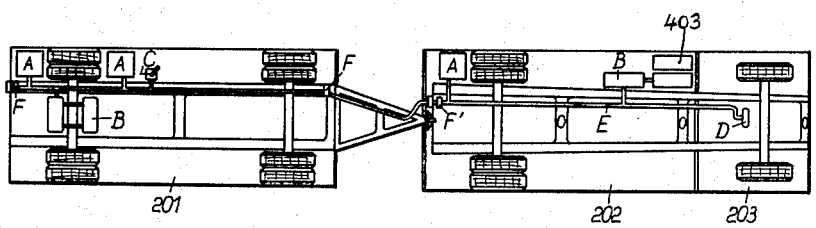
Fig.2
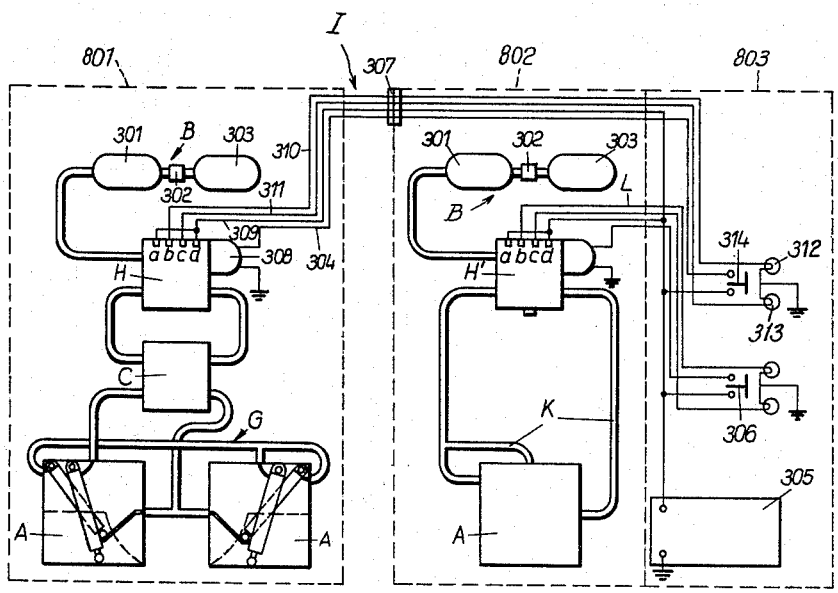
Fig.3
*Inventor*
Walter Nesselberger
BY
*AGENT*

Inventor
Walter Nesselberger
AGENT

April 6, 1965 W. NESSELBERGER 3,176,798
VEHICLE WHEEL CHECK MEANS
Original Filed Nov. 1, 1962 5 Sheets-Sheet 4
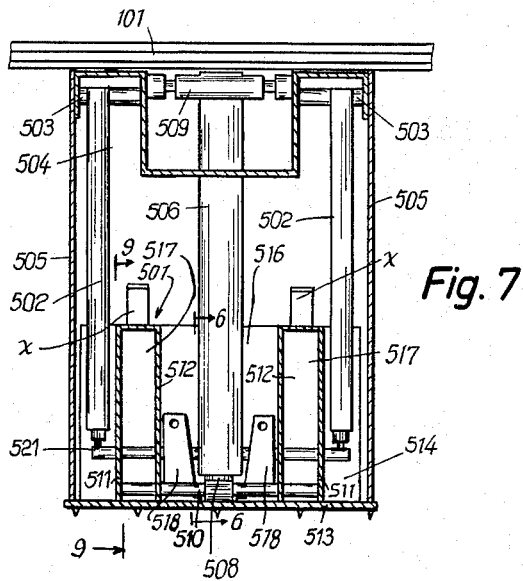
Fig. 7
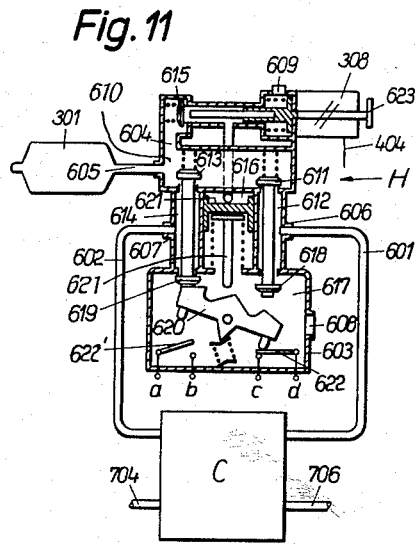
Fig. 11
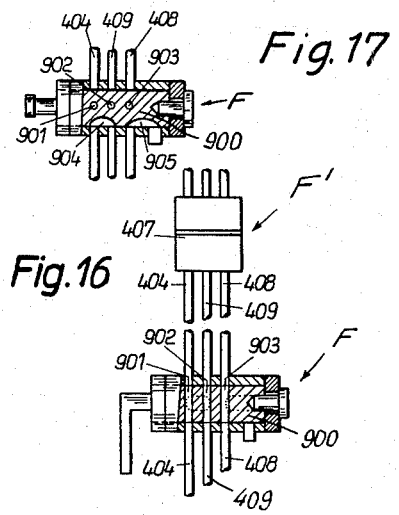
Fig. 17
Fig. 16
Inventor
Walter Nesselberger
BY
H. Gilbner Lehmann
AGENT April 6, 1965 W. NESSELBERGER 3,176,798
VEHICLE WHEEL CHECK MEANS
Original Filed Nov. 1, 1962 5 Sheets-Sheet 5

Inventor
Walter Nesselberger
BY
AGENT

United States Patent Office 3,176,798
Patented Apr. 6, 1965

3,176,798
VEHICLE WHEEL CHECK MEANS
Walter Nesselberger, Hirtenstr. 11, Wiesbaden-Sonnenberg, Germany
Continuation of application Ser. No. 234,591, Nov. 1, 1962. This application Feb. 14, 1964, Ser. No. 347,642
12 Claims. (Cl. 188—4)

This is a continuation of application Serial No. 234,591, filed November 1, 1962, now abandoned.

This invention relates to means for preventing forward and backward rolling of a vehicle such as a motor vehicle with or without trailer, and more particularly to wheel check means for preventing such rolling.

The invention concerns improvements in the device described in my United States Patent No. 2,957,549 dated October 25, 1960. By the present invention there is achieved primarily, in comparison to the device described in my above-identified patent, an essential increase in operating safety and simultaneously a simpler and clearer construction.

A further object of the invention is to provide a novel and improved combination compressed air means for activation of wheel blocks, such means being characterized by special compressed air cylinders which are separate from the prior telescopic drive devices utilized in my patent. The special or additional actuator means further comprises pistons disposed in the cylinders, said cylinders and pistons being located at the interiors of housings secured to the vehicle. The cylinders are in immediate connection with support plates of the housings and the pistons are directly connected with the blocks. Through the working of the special compressed air cylinder in conjunction with the telescopic drive devices (which are activated themselves by compressed air) any likelihood of jamming of the telescopic drive devices when the blocks are in their operative positions, is eliminated. For example, such devices previously could be jammed if the blocks were laid on a stone, uneven surface or the like. The special towline utilized with the device of my Patent No. 2,957,549 for raising the blocks is now eliminated, by means of the above special compressed air cylinder.

A feature of the invention resides in the provision of a novel device of the kind described wherein, for any position of the wheel block between its operative position and its inoperative position the compressed air cylinder and its drive rod are set steeper or more upright than the telescopic drive devices, in order to guide the block in its downward movement from the rest position to the operative position relatively steeply downward and most effectively into engagement with the wheel. Only in the last part of the path of movement of the block is there a greater component directed longitudinally of the vehicle, in order to bring the block into the angular space between the wheel and support surface.

Another feature of the invention resides in the provision of a device of the kind described, wherein equilibrium tension devices are utilized in the interior of the wheel block to distribute the forces transmitted to the block during its movement by the drive rod and by the telescopic drive devices, the movement being such that during the entire path the block maintains essentially a horizontal position.

It is a further important purpose of the invention to provide an improved organization having wheel block devices of the type described and further comprising a compressed air feed system, with compressed air switch valves, and a compressed air source, wherein these latter actuation-and-control devices for the vehicle (for example the trailer) are arranged on the vehicle itself. It is only necessary that the prime activating device for the compressed air valve which controls the motion of the wheel block be located in the cab of the motor vehicle or tractor. Thus, with attachment of a trailer vehicle to the tractor, the wheel block devices of the trailer may be easily activated from the cab of the tractor.

Still another feature of the invention resides in the provision of an organization as above set forth, wherein the main switch valve located in the compressed air lead system of the vehicle is arranged in such a way that it operates automatically upon separation from the prime activation device in the cab of the motor vehicle, to advance the wheel block devices to be in their operative position. Further, in the compressed-air lead system there is arranged in accordance with the invention an additional, secondary switch valve which is adapted to control the compressed-air leads attached to the main switch-over valve, for the purpose of causing the wheel block devices to be retracted into the inoperative or rest positions without requiring activation of the main switch-over valve. This is of essential importance in those cases where a disconnected vehicle, particularly a disconnected trailer, must be pulled a short distance by hand or with a winch, without coupling it to a motor vehicle, or where a trailer is to be coupled onto a motor vehicle which does not have in its cab an activation device for the main switch-over valve on the trailer vehicle.

Below are described, as examples but not in a limiting sense, a typical wheel block device made according to the invention and several organizations utilizing such devices. In the drawings:

FIGURE 1 is a schematic diagram of an installation organization using wheel blocks according to the invention, such organization comprising a trailer vehicle on which the blocks are installed. There is also shown a motor or tractor vehicle, and an activation device in the cab of the motor vehicle.

FIG. 2 is a schematic diagram of an installation according to the invention, comprising a motor vehicle and trailer both of which have wheel blocks; the prime activation device is in the cab of the motor vehicle.

FIG. 3 is a schematic representation of an organization having, in accordance with the invention, electric activation devices or control means.

FIG. 7 is a section taken on the line 7—7 of FIG. 5, somewhat schematized.

FIG. 9 is a schematic representation of the brake-block, in vertical section, taken on line 9—9 of FIG. 7.

FIG. 10 is a fragmentary elevation of an equilibrium tensor employed in the wheel block.

FIG. 11 is a schematic representation of an electropneumatic valve used in connection with the invention, old in itself.

FIG. 16 is a schematic representation of an additional coupling valve for the unit according to FIG. 4, the valve being in open or operative condition.

FIG. 17 is a similar representation of the valve of FIG. 14 but shown in closed condition.

FIG. 18 is a diagrammatic representation on a reduced scale showing the wheel block in the raised or retracted position.

Figure 4:
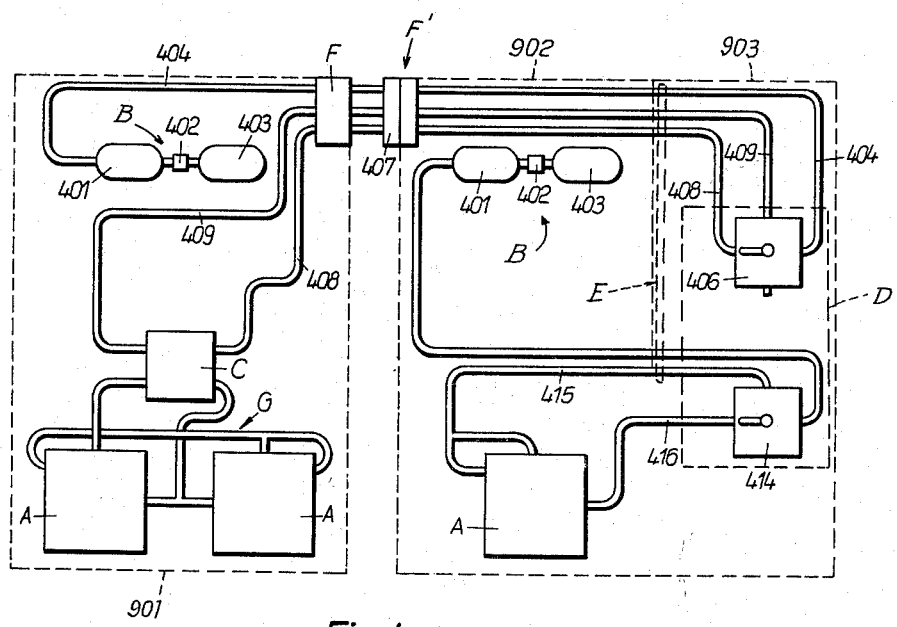
FIG. 4 is a schematic representation of an organization having, in accordance with the invention, manually controlled activation or control means.

In the example of FIG. 1 there is shown a trailer and tractor, wherein only the trailer 101 is equipped with brake and safety or wheel block devices A according to the invention, whereas the motor vehicle or tractor 102 carries no devices of this type. As differentiated from my United States Patent No. 2,957,549, the present invention provides on the trailer itself devices B which effect infeed of compressed air for the activation of the wheel block devices A. In addition, the trailer 101 also has its own additional switch-over device C (hereinafter also called an "additional valve"), which makes it possible to activate the wheel block devices A from the trailer 101 as well as from the tractor vehicle 102. The prime, remote activation device D is at any rate located in the cab 103 of the motor or tractor vehicle. An air feed system E for the feeding of compressed air to the wheel block devices A and also for the control and activation of these devices is schematically indicated in FIGS. 1 and 2 only by a single lead. The construction of this system is seen better in FIG. 3 or FIG. 4, especially FIG. 4.

The organization shown in FIG. 1 of the unit according to the invention is particularly suited to combinations involving vehicles which are intended to carry only little load in relation to the motor power or no load at all, as for example tractors, truck-tractors and the like.

In the example of FIG. 2, as in my United States Patent No. 2,957,549 not only the trailer 201 but also the motor or tractor vehicle 202 is equipped with wheel block devices A. An essential difference from my United States Patent No. 2,957,549, however, resides in the fact that here not only the trailer vehicle 201 but also the motor or tractor vehicle 202 has its own devices or compressed air tank units B for supplying compressed air to the wheel block devices A. In addition, the systems E for the feed and control of the compressed air, in the case of the trailer 201 and the motor vehicle 202, are closed off or able to be closed off in themselves, while the main activation devices (multi-position valve means) D for the wheel block devices A not only of the trailer 201 but also of the motor vehicle 202 are installed in the cab 203 (in FIG. 2) of the motor vehicle. The trailer 201 of FIG. 2 is provided, as in the example of the FIG. 1, with a switch-over device comprising an additional valve C, which makes it possible to activate the wheel block devices A even when the trailer 201 is uncoupled from the motor vehicle 202.

In both the examples of FIGS. 1 and 2 a separation device F is provided in the activation or common air feed systems E where the systems E are of the pneumatic type.

FIG. 3 shows schematically an organization according to the invention with a pneumatic activation system and an electric control system. Here the trailer 801 has at least one pair of wheel block devices A, which are explained in more detail later. This pair of wheel block devices A is connected in parallel with its pneumatic activation leads G and connected to the additional valve or switch-over device C. The main activation valve means is in this example an electro-pneumatic switch valve H, which is explained in more detail later. The activation device or compressed air tank unit B itself consists essentially of a compressed air container 301, which is connected across an overflow valve 302 to the braking air tank 303. The overflow valve 302 may be any known type of gas-pressure reducing valve, one example of which is described in the patent to Goodner, No. 2,891,569 dated June 23, 1959. The compressed air tank 303 can be a usual commercial variety such as is put on the market, for example, by the firm Robert Bosch, Inc., Stuttgart, Germany, under the designation SVBH. Likewise, the overflow valve 302 can be a well-known type, such as put on the market by the firm Robert Bosch, Inc., Stuttgart, Germany, under the designation SVVE 22.

The pneumatic activation system for the trailer 801 is thus closed off or complete in and of itself. The electric control leads I for the electro-pneumatic main activation valve means H are led to the cab 803 of the motor vehicle 802. The electric control leads I here contain a main control lead 304, which is passed from the battery 305 carried by the motor vehicle 802 across a usual push-button switch 306 installed in the cab 803 of the vehicle 802, through a usual coupling piece 307 arranged between the motor vehicle 802 and the trailer 801 and to the electromagnet 308 of the electropneumatic valve means H. The electric leads I contain, in addition, a main current lead 309 which is passed from the battery 305 across the coupling piece 307 to the signal switch terminals $a$ and $d$ of the main activation valve means H. From the signal switch terminals $b$ and $c$ are led electric signal leads 310 and 311 to signal lamps 312 and 313 in the cab 803, in order to indicate there the position at any time of the main activation valve means H.

In the example of FIG. 3, the motor vehicle 802 is equipped with a simple wheel block device A according to the invention. The pneumatic activated leads (air feed system) K of this device are attached directly to the main activation valve means H′ in the vehicle 802. A switch-over device such as the additional valve C on the trailer 801 is not necessary on the vehicle 802, since the wheel block device A can be activated at any time from the cab 803 of the motor vehicle 802. The rest of the structure of the pneumatic activation system, and of the electric control system L is the same as for the trailer 801 with the difference that no coupling element line 307 is necessary, and the corresponding terminals $a$, $b$, $c$, $d$ of the main activation valve means H′ are connected permanently with the push-button switch 314 and the signal lights 315 and 316.

The switch-over device or additional valve arranged on the vehicle 802 in the system according to the FIG. 3 (corresponding to the valve C in the pressure system G of the trailer 801) can be installed directly in the main activation valve means H′, as is explained in more detail in connection with FIG. 11.

In the example of FIG. 4 a completely pneumatic activation and control system is used. Here each vehicle 901, 902, be it the trailer 901 or the motor vehicle 902, has its own compressed air container 401 for the activation of the wheel block devices A. This compressed air container 401 is attached, as in the case of the system according to FIG. 3, across an overflow valve 402 of usual type (similar to the valve 302 identified with U.S. Patent No. 2,891,569) to the braking compressed air tank 403, which is filled in usual manner with compressed air.

From the compressed air container 401 of the trailer 901 a compressed air lead 404 extends to a shut-off valve F installed on the trailer, which is explained in more detail in connection with FIG. 16. From there the compressed air main lead 404 runs to the coupling piece 407, which is constructed in any usual manner. On the motor vehicle 902 an additional shut-off valve and coupling F′ can be provided. The main compressed air lead 404 leads to a manual rotary valve means 406 arranged in the cab 903, which is constructed in a known manner and, for example, is put on the market by the firm Robert Bosch Inc., Stuttgart, Germany, under the designation SV/DHA 2. The valve 406 may be similar to the valve 700 described below and shown in FIGS. 12, 13 and 14. From the manual rotary valve means 406 two compressed air control leads 408 and 409 pass through the shut-off valves and coupling F and F' and the coupling piece 407 to the trailer 901 where they end at a switch-over or additional valve C of the same sort as is used in connection with the system according to FIG. 3. The valve C is similar to the valve 700 of FIGS. 12–14. From this switch-over device or additional valve C the compressed air lead system G leads to the wheel block devices A in the manner explained in more detail in connection with FIGS. 12–14.

Figure 15:
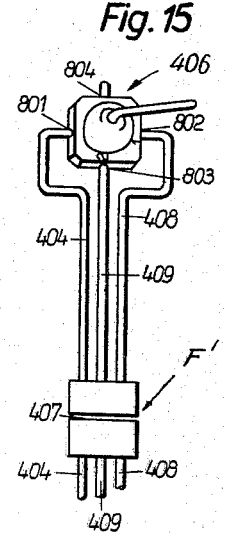
FIG. 15 is a schematic representation of a control including a four-way valve device (old in itself) which constitutes a manual rotary valve for the manually controlled pneumatic control organization of FIG. 4.

In the case of the motor vehicle 902 the main pressure lead 410 leads to a further manual rotary valve means 414, from which the pressure leads 415 and 416 are passed to the wheel block device A. The arrangement of the manual rotary valve means 414 is the same as that of the manual rotary valve means 406 shown in FIG. 15, and these two valves are like the valve 700 explained in more detail in connection with FIGS. 12–14.

*Wheel block device "A" (FIGS. 5 to 10)*

Figure 5:
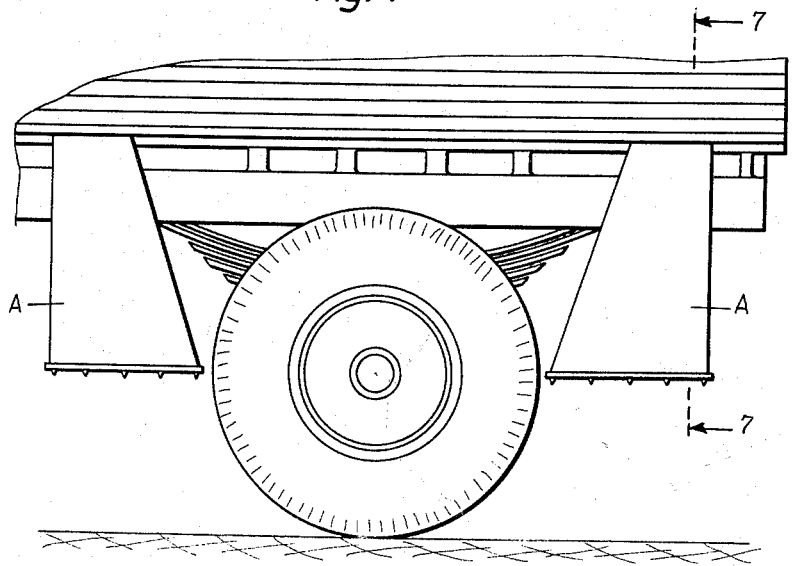
FIG. 5 shows the back part of a vehicle in side elevation, provided with safety wheel block devices both in front of and behind the rear wheel.

As FIG. 5 shows, the wheel block devices A can be installed in pairs at the rear wheels of a vehicle, preferably a trailer. Thus they prevent any undesired rolling away of the vehicle, not only in forward but also backward directions.

A block 501 is pivotally connected with the lower ends of two telescoping guide elements or drive devices 502 such as are also used in connection with my United States Patent No. 2,957,549, while the upper ends of these guide elements or drive devices 502 are pivotally mounted at 503 on a support plate 504 adapted to be secured to the underside of the vehicle 101.

According to the invention, aside from the guide elements 502, in the interior of the housing 505 there is arranged a compressed air drive or motive device which consists of an air cylinder 506, a piston 507 guided inside it, and a piston or drive rod 508. The air cylinder 506 is constructed for two-directional activation, i.e. for the purpose of applying the force necessary for the downward shifting of the block 501 and also that needed for raising the block. The air cylinder 506 is provided at its upper end with a mounting device 509 and with this is pivotally mounted in the housing 505 on the support plate 504 for movement in a plane parallel to the longitudinal travel of the vehicle. The piston or drive rod 508 carries on its lower end a pivotal mounting device 510 likewise, with which it pivotally carries the block 501 for movement in the same plane as the air cylinder 506.

The block 501 is constructed hollow in a manner familiar in itself to achieve slight weight and to provide cells for the safe disposition of the piston rod 508 and the guide elements or drive devices 502. For this purpose the block 501 has, in addition to its outer side walls 511 two inside walls 512. These four walls are welded to the bottom plate 513, to the concavely arched wheel contact plate 514, and to the back wall 515. The two intermediate walls 512 are so arranged that between them there exists a chamber 516 open at the top, in which the air cylinder 506 can operate unhindered. The chamber 516 is formed to accommodate equilibrium resilient tension devices 518, 520 described below.

As can be seen from FIGS. 9 and 10, the equilibrium tension devices consist of two upright arms 518 rigid on the shaft 510 of the drive rod 508. The arms 518 carry on their upper parts lugs 519, on which as shown in FIG. 9 there are attached resilient tension springs 520. The tension springs 520 are secured at their other ends to the inner surface of the wheel contact plate 514 and the back wall 515 of the block 501. Upon operation of the piston rod 508 to shift the block 501 out of the position shown in FIG. 7, each of the two vertical arms 518 tenses one of the tension springs 520, so that the block 501 continually strives to maintain its position with respect to the piston rod 508 as shown in FIG. 9.

The mounting shaft 510 of the piston rod 508 is arranged in the lower part of the block 501, in the vicinity of the bottom 513 of the block. The mounting device 521 for the drive elements 502 extends crosswise through all walls 511 and 512 of the block and lies parallel to the mounting device 510 for the piston rod 508, being displaced upward and forward, while the mounting shaft 503 on the upper ends of the drive elements 502, disposed parallel to the mounting shaft 509 of the air cylinder 506 is disposed on the support plate 504 relatively downward and back. By such construction the air cylinder 506 in any position of the block 501 is set steeper than the drive elements 502, so that the block 501 on activation can adapt itself in the course of its movement approximately to the shape of the wheel. The compressed air connections 522 and 522' are installed in the usual manner on the lower and upper parts of the air cylinder 506. Likewise each telescoping drive element 502 has in its upper part a compressed air connection 523, as is also found in my United States Patent No. 2,957,549.

Figure 8:
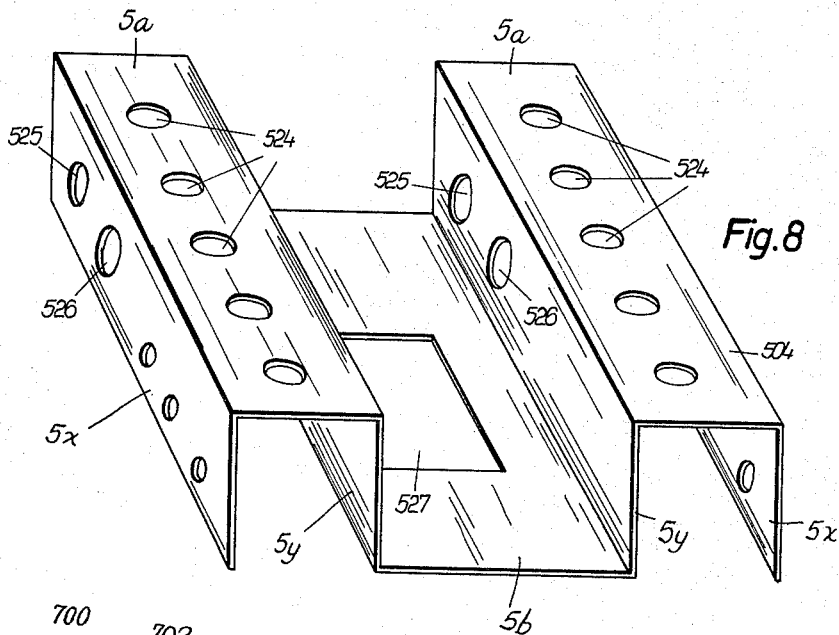
FIG. 8 is a perspective view of the support plate for the device, according to the invention.

The support plate 504 shown in perspective in FIG. 8 serves as a secure mounting for the air cylinder 506 and the telescoping drive elements 502, all of which are activated by compressed air. Along with bores 524 for attaching the support plate 504 to the underside of the bed of the vehicle 101, the support plate 504 has bores 525 to receive the mounting shaft 503 for the telescoping drive elements 502. In addition, in the support plate 504 bores 526 are provided for the mounting shaft 509 of the air cylinder 506. In order to assure the necessary freedom of movement for the air cylinder 506, the support plate 504 has in its middle part a rectangular window-like recess 527.

To achieve the necessary stability and strength the suspension plate 504, as FIGS. 7 and 8 show, is constructed with two outer flange parts 5x lying in vertical planes and two middle vertical flange parts 5y. Between these flange parts are two upper outside cross-pieces 5a and one lower middle cross-piece 5b. The support plate 504 can be produced in this form from one piece of sheet metal.

For freedom of movement of the air cylinder 506 a flexible positioning means for the block 501 is constructed in the form of two narrow flexible strips x. Finally, the freedom of movement of the air cylinder 506 and of the rod 508 is further extended by providing a recess Z in the upper part of the back wall 515 of the block 501, such wall at the same time being constructed as a limitation for the pivotal movement of the piston rod 508 in relation to the block 501.

The wheel block device 501 according to the present invention, in comparison with that of my United States Patent No. 2,957,549 has the advantage of a more rapid and safe operation. This is achieved with the present device by virtue of the fact that the piston rod 508 pushes the block 501 into its effective position in common with the two telescoping drive elements 502 under the action of compressed air. Also, the return of the block 501 into its rest position can now take place faster, because the telescoping drive elements, being vented for raising the block 501, prevent a pendulum or swinging motion of the block during the raising.

Figure 6:
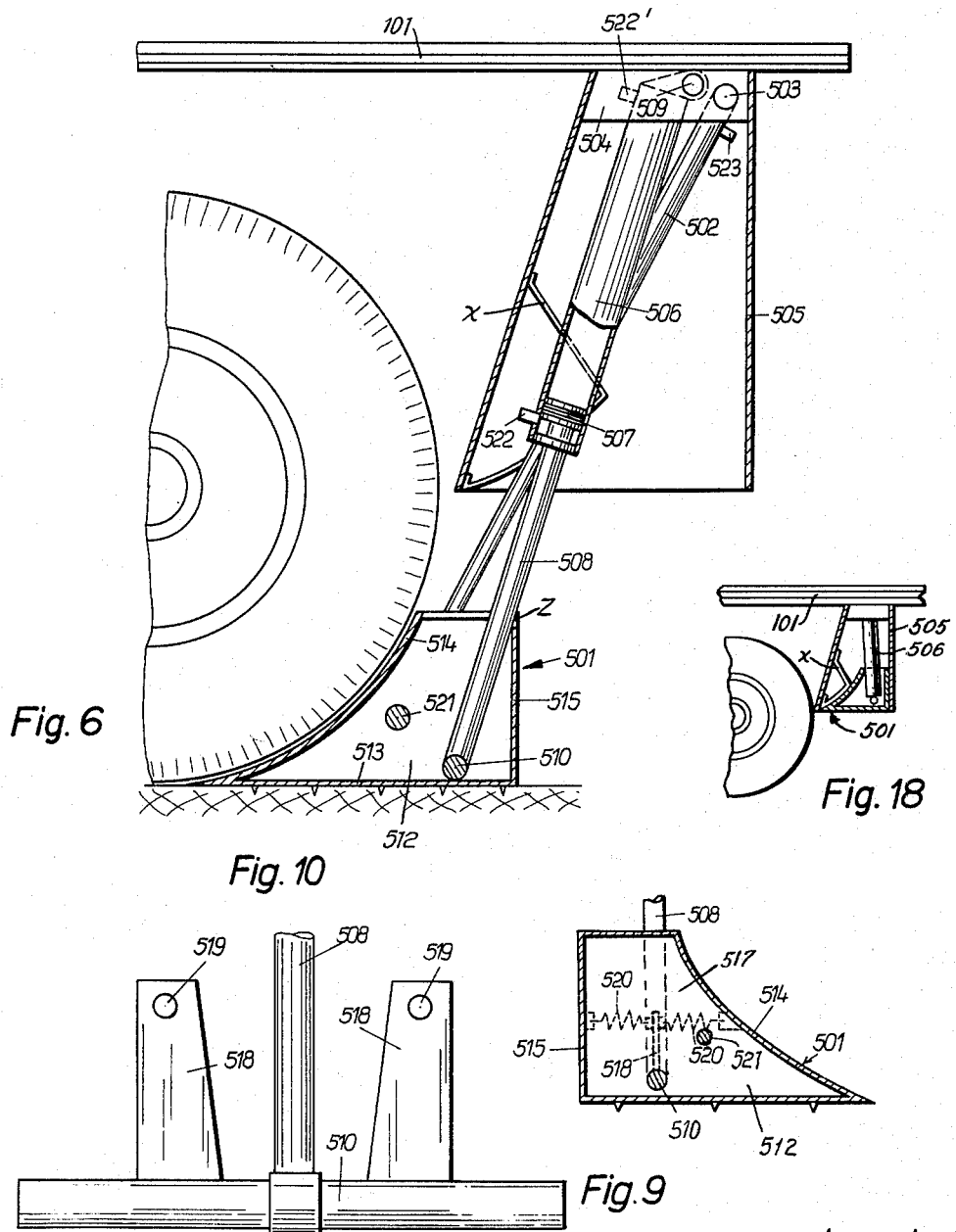
FIG. 6 is a view partly in elevation and partly in section, showing the wheel block attachment of the invention in operative position on a vehicle. The section is taken on the line 6—6 of FIG. 7.

The construction described above has distinct advantages in effecting a reliable and smooth operation of the wheel block. Referring to FIGS. 6 and 7 it will be seen that the raising cylinder 506 is centrally located with respect to the block, and is connected to the lower portions of the walls 512 by means of outwardly extending connectors comprising the bar portions 510. The lowering drive elements 502 are symmetrically disposed on opposite sides of the center cylinder 506, and extend along outside surfaces of the vertical walls 511, being connected thereto by inwardly extending connectors comprising portions of the rod 521. The walls 511, 512 together constitute vertical wall structures which form rigid parts of the block 501, and by virtue of the elements 502 and 506 being connected to lower portions of the two symmetrically disposed wall structures 511, 512 a very compact, space-saving balanced organization is had due to the symmetry and recessed arrangement of the cylinder-piston assemblage in the block. This, together with the rigidity of the wall structures and remaining portions of the wheel block results in a smooth and reliable raising and lower movement of the same. Moreover, the disposition of the wall structures 511, 512 on opposite sides of the center drive cylinder 506, with the outer two cylinders 502 being disposed alongside the outside surfaces of the wall structure enables a very compact construction to be achieved without requiring any reduction in the lengths of the cylinders or the strokes thereof. Accordingly, the housing 505 may be located a relatively great distance above the road surface, as seen in FIG. 6, to enable it to pass freely over uneven terrain, large stones and the like without suffering damage.

The provision of the resilient means comprising the arms 518 and the springs 520 is of considerable importance, in accordance with the invention, for the following reasons: Referring to FIGS. 6, 9 and 18, action of the resilient means is as follows: At the time that the wheel block 501 is being lowered, any unequalized driving force as between the actuator rod 508 and the two actuator rods of the drive devices 502 will result in the leading rod or rods tending to help the lagging rod or rods, through the action of the arms 518 and the springs 520. The said springs and arms tend to maintain the block 501 in a given position as shown in FIG. 9, and if a lagging actuator rod or if an unbalance in the drive occurs which would have the effect of displacing the block from said gvien position, the resilient positioning means will counteract the drag and tend to maintain the position of the block. The advantage of such arrangement is that the block 501 will always be properly positioned for entrance between the wheel and the ground, as illustrated in FIG. 6, or for re-entrance into the housing 505 as illustrated in FIG. 18. If the block 501 were to be canted counterclockwise from its proper position, the pointed front edge would first strike the ground and prevent proper engagement of the block with the wheel. If the block were to be canted clockwise, the pointed front edge would strike the wheel and prevent proper engagement of the block therewith.

Various conditions may result in one or several of the actuator rods lagging. For instance, if the compressed air pipes 522 and 523 are covered with ice in the winter, the passage of air through them may be impeded due to such things as trapped moisture in frozen or semi-frozen state. Cold weather also changes the viscosity of any lubricants which may be utilized in connection with the driving devices, resulting in a change in response of the same to the driving fluid.

The springs 520 take over power from the leading driving device and transmit it to the lagging device which may be hampered in some manner. If only one of the telescopic guides 502 is sluggish this can cause a torque in a plane which is transverse to the driving direction (or perpendicular to the plane of the paper, when viewing the figures), and in addition a torque may occur in the plane of the driving direction or parallel to the plane of the paper. Such torques may be particularly harmful, since they can result in jamming of the entire wheel blocking arrangement. However, by virtue of the provision of the springs 520 wherein power is transmitted from the leading telescopic guide or leading actuator rod 508 to the elements which lag, sufficient counteraction of the torques is effected to avoid jamming of the mechanism.

The symmetrical arrangement is especially effective. The disposition of the arms 518 on opposite sides of the rod 508 and between the telescopic drive devices 502, in conjunction with the symmetrical arrangement of the drive rods insures a smooth action of the mechanism, with freedom from jamming or like operational difficulties.

The rigidity resulting from the symmetrically disposed box-like wall structures 512, together with the central disposition of the actuator rod 508 and the oppositely arranged telescopic devices 502, in conjunction with the connector bars 510 and 521 all result in a rigid block structure and smoothly operating drive mechanism, to the end that reliable lowering and raising movement of the block may be had with freedom from jamming.

*Main activation valve means H (FIGURES 3 and 11)*

In FIG. 11 there is shown schematically the electro-pneumatic main activation valve means H (FIG. 3) which comprises a commercially produced electro-pneumatic valve SV/DVE of the firm Robert Bosch, Inc., Stuttgart, Germany. Alternately, it can direct compressed air either into one or the other of the compressed air lead or feed systems 801 or 802 of the compressed air infeed system G (FIG. 3) while venting the unpressured system respectively. In addition, it can switch on each time one of the two signal lights 312 or 313. The control processes are initiated by the electro-magnet 308, which is made to respond by the push-button switch 306. The valve housing 603 has five air connections. At the connection or passage 604 there is attached the wheel block air container 301, through a pipe line 605. On the connection 606, which lies adjacent the magnet 308 there is attached the infeed lead 601 which leads to the switch-over or additional valve C. In the normal position of the switch-over or additional valve C the lead 601 passes compressed air to the lower compressed air connection 522 (FIG. 6) of the air cylinder 506. The connection 607 of the valve housing 603 carries the infeed lead 602, which likewise is connected with the switch-over valve C and, for the normal position of the switch-over valve C, passes compressed air to the upper inlet 522′ (FIG. 6) of the air cylinder 506 and to the inlets 523 of the telescoping drive devices 502. The vent connections 608 and 609 of the valve housing 603 lead into the open.

In the interior of the valve housing 603 there is arranged a storage chamber 610, into which the connection or passage 604 opens. At the chamber 610 one inlet valve 611 is associated with a first intermediate chamber 612, which has the connection 606. The second inlet valve 613 is associated with a second intermediate chamber 614, which has the connection 607. In addition the control valve 615 controls fluid passing from the supply chamber 610 to the valve control cylinder 616.

The valve housing 603 contains in addition the venting chamber 617, which can be connected through the outlet valves 618 or 619 respectively with the intermediate chambers 612 or 614. The two pairs of valves 611, 618 and 613, 619 are lifted alternately by the pressure pads of the switch tilt-table 620 so that with the just raised pair of valves the outlet valve 619 is closed and the inlet valve opens 613. Vice versa, in the case of the second pair of valves 611, 618 under the influence of the valve table 620, the outlet valve 618 is opened and the inlet valve 611 closed. The switch tilt-table 620 is for its part activated by the switch piston and ram 621.

The activating of the wheel block devices A takes place as follows:

In the position of the main activation valve means H shown in FIG. 11 the block 501 is in its operative position (FIG. 6) under the wheel of the vehicle. If the block 501 is to be raised, then the driver activates a push button switch (306 or 314). Through the current impulse thus produced the electro-magnet 308 draws its armature to the left, with the control valve 615 being lifted from its seat and the compressed air from the container 610 streaming into the switch cylinder 616. The switch piston and ram 621 pushes the left arm of the switch tip-table 620 downward, whereupon the inlet valve 613 closes under the effect of its spring and the outlet valve 619 opens. Thus the upper part of the air cylinder 506 and the telescoping drive devices 502 are vented through the line 602. At the same time, the left arm of the switch tip-table 620 closes the switch 622', and completes therewith the circuit for the signal light 315 in the cab 803 which indicates that the wheel block is in its idle or inoperative position and that the vehicle 801, 802 is ready to travel. The right arm of the switch tip-table 620 at the same time raises the outlet valve 618 into its closed position and the inlet valve 611 into its opened position, so that the compressed air passes across the intermediate chamber 612 and the pressure line 601 into the lower part of the air cylinder 506, in order to lift the block 501 into its idle position. The right arm of the switch tip-table 620 here releases at the same time the electric switch 622, so that the circuit of the signal lamp 316 is interrupted (which lamp indicates when the block 501 is in working position).

As soon as the driver releases the push button (306 or 314), the armature of the electro-magnet 308 with the control valve 615 returns to its initial position shown in FIG. 11, so that the switch cylinder 616 is vented through the bore 609 and the switch piston and ram 621 return into the idle position with, however, the switch tip-table 620 remaining in the previously set position. On a renewed activation of the push button 306 or 314 the switch tip-table 620 will be returned to that position which is shown in FIG. 11, and in consequence the corresponding switch-over will be effected in order to bring the block 501 into its working or operative position of FIG. 6.

*Switch-over device or additional valve "C"*
*(FIGS. 1, 2, 3 and 11–14)*

The switch-over device or additional valve C is provided especially for trailer vehicles, being connected in the air feed system G for the wheel block devices A in order to be able to activate said devices A even when the trailer vehicle is uncoupled from the motor vehicle whereby the main switch valve means H (D in FIGS. 1, 2 and 4 or control switch 314 in FIG. 3) can no longer be activated.

The switch-over device or additional valve C can, as FIG. 11 shows for the valve means H, also be operated by an armature of an electro-magnet (like the solenoid 308) controlled by a push button. The main activation valve means H installed on the trailer vehicle 801 can also be controlled by hand when its electrical control lead 304 is interrupted.

However, since the main activation valve means H as a rule is well encased in order to protect it against damage, it is advantageous to use an additional switch-over valve (C in FIG. 3 or 700 in FIGS. 12–14), these being similar to each other). Such a switch-over or additional valve can be a traditional four-way cock, such as is put on the market by the firm Robert Bosch, Inc., Stuttgart, Germany under the designation SV/DHA 2.

This valve is provided with a first inlet 701, to which the air lead 601 from the main switch valve means H (FIG. 11) or the air lead 408 from the main switch valve means 506 (FIGS. 4 and 15) is attached. The valve 700 in addition has a second inlet 702, to which the compressed air lead 602 from the main switch valve means H (FIG. 11) or the compressed air lead 409 from the main switch valve 406 (FIGS. 4 and 15) is connected. To the first outlet 703 of the switch-over valve 700 is attached the pressure feed 704 of the pressure feed system G, which leads to the lower connection 522 of the air cylinder 506 (FIG. 6). Normally the switch-over valve 700 is in the position shown in FIG. 13 whereby the first inlet 701 is connected with the first outlet 703 and the second inlet 702 connected with the second outlet 705. If the switch-over valve 700 is placed in the position shown in FIG. 14 it then connects the first inlet 701 with the second outlet 705 and the second inlet 702 with the first outlet 703. Thus, the pressure feed lines 601 or 408 and 602 or 406 coming from the main switch valve means H or 406 are exchanged for the pressure feed lines 704 and 706 leading to the wheel block devices A. That one of the pressure lines 704 and 706 which has previously been under pressure is now vented through the main activation valve means H or 406 or (with an uncoupled trailer) according to FIG. 4, through the coupling valve F. The previously vented line 706 or 704 is now connected through the main activation valve means H or 406 or the coupling valve F to the air container 301 or 401. The reversal of the switch-over valve 700 thus causes the blocks 501 of the wheel block devices A to move into their other positions, each time. Thus a block 501 of an uncoupled trailer vehicle can be moved by each reversal of the switch over valve 700 out of one position and into the other.

*Main activation valve means 406*
*(FIGS. 4 and 15)*

Figures 12, 13, 14:
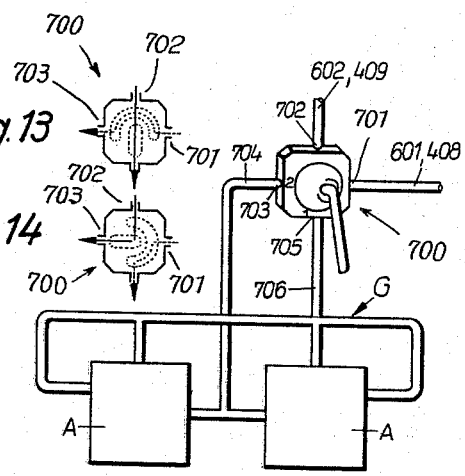
FIG. 12 is a schematic representation showing a control arrangement having a four-way cock, old in itself, which constitutes an additional switch-over element.
FIG. 13 is a diagrammatic representation of the valve of FIG. 12, showing one position thereof.
FIG. 14 is a diagrammatic representation of the valve of FIG. 12, showing another position thereof.

The main activation valve means 406 for fully pneumatic systems, when installed in the cab 903 of the motor vehicle 902 according to FIG. 4, can be constructed in the same way as the switch-over valve means 700 shown in FIGS. 12–14; i.e. it can be a four-way cock, type SV/DHA 2 of the firm Robert Bosch, Inc., Stuttgart, Germany. In contrast to the arrangement of FIG. 12 the main activation valve means 406 however has only one inlet 801, which is connected through the line 404, the coupling piece 407, and the coupling valve F shown in FIG. 4 with the air container 401 installed on the trailer 901. In addition, the main activation valve means 406 has three outlets 802, 803 and 804. The first outlet 802 is connected through the line 408, the coupling piece 407, and the coupling valve F with the switch-over valve 700. Likewise the second outlet 803 is connected through the air line 409, the coupling piece 407 and the coupling valve F with the switch-over valve 700, as can be seen from FIG. 12. The third outlet vents into the open air. At one position of the main activation valve means 406 (corresponding to the position of the switch-over valve 700 shown in FIG. 13) compressed air is fed to the lower air inlet 522 of the air cylinder 506 (FIG. 6) through the line 404, the main activation valve means 406, the line 408, the switch-over valve 700 and the line 704, while the upper connection 522 of the air cylinder 506 and the connections 523 of the telescoping drive devices 502 are vented through the line 706, the switch-over valve 700, the pressure line 409 and the main activation valve means 406 and outlet 804. On changing the main activation valve means 406 into its other position, corresponding to the position of FIG. 14 of valve 700, the line 409 is then joined to the pressure line 404 and the line 408 connected with the outlet 804.

*Coupling valve "F" (FIGS. 2, 4, 16 and 17)*

As FIG. 4 shows, on the trailer vehicle 901 a coupling valve F, 900 is coordinated to the coupling piece F, 407. The coupling valve F, 900 is constructed as a well known multiple-path valve with two positions. In its open position of FIG. 16 it connects through its bore 901 the pressure line 404 coming from the air container 401 with the coupling piece 407, and with its bore 902 it connects the pressure line 408 leading to the switch-over valve C with the coupling piece 407. In the position shown in FIG. 17 the three leads 404, 408 and 409 are shut off from the coupling piece 407. A first cross bore 904 now connects the pressure line 404 coming from the container 401 with the pressure line 409 leading to the switch-over valve C, while a second cross bore 905 vents the pressure line 408 leading to the switch-over valve C. If the switch-over valve C is constituted as the valve 700 shown in FIG. 12, having the position of FIG. 13, then through the reversal of the coupling valve 900 into its position of FIG. 17 the pressure line 704 would be vented and the pressure line 706 of the feed system G would be placed under pressure, so that the block 501 of the wheel block devices A would be moved into their effective positions.

The embodiments shown constitute a few examples, which however do not limit the scope of the invention. Rather, variations and changes are possible without deviating from the idea of the invention, as it is characterized in the following claims.

I claim:

1. A housed and enclosed device for preventing undesired rolling of a parked vehicle comprising, in combination:
   (a) a housing in the form of an enclosure having a supporting plate for securing it to the vehicle, said housing having an open bottom,
   (b) a wheel block engageable with the vehicle wheel, said block being movable between an inoperative position which is raised from the ground, removed from the wheel and located in the housing to an operative position removed from the housing and engaged with the wheel and the ground adjoining the wheel,
   (c) said block having a bottom wall arranged to close completely the open bottom of the housing when the block is in the latter,
   (d) said block having a concave wheel contact plate and being larger at its bottom than at its top,
   (e) block positioning means comprising two spaced members disposed in the housing and engageable with the wheel contact plate of the block when the latter is in the housing, to position the block securely when in the housed inoperative position,
   (f) said block having two spaced vertical wall structures extending from front to rear and connected to the bottom wall and to the concave wheel contact plate,
   (g) extendable and retractable pneumatically operated telescopic drive devices mounted on the support plate of the housing and extending along the outsides of the vertical wall structures of the block, said drive devices including inwardly extending connectors connected to lower portions of the wall structures and being adapted to extend diagonally downward from the support plate toward the vehicle wheel, said devices when being extended functioning to shift the block to the operative position, and when being retracted functioning to guide the block to inoperative position,
   (h) a drive rod independent of said drive devices, extending downward between the wall structures and at its lower end having outwardly extending connectors connected to said lower portions of the vertical wall structures of the wheel block, and
   (i) an air cylinder mounted on the support plate independently of the drive devices and a reciprocative piston therein, said piston being connected to the upper end of the drive rod.

2. A device as in claim 1, and further including:
   (a) pivotal mounting means connecting the air cylinder and drive devices to the housing support plate, providing for swiveling movement of the cylinder and drive devices in parallel planes along the direction of travel of the vehicle wheel,
   (b) additional pivotal mounting means connecting the drive rod and drive devices to the block, providing for swiveling movement of said rod and devices with respect to the block whereby the latter follows a path parallel to the said parallel planes.

3. A device as in claim 2, wherein:
   (a) the said additional pivotal mounting means comprises a shaft connected to the lower end of the drive rod and carried by the block,
   (b) positioning arms are provided, carried by and extending upward from the shaft within the block,
   (c) the concave wheel contact plate of the block constituting a front wall thereof, said block having an opposite back wall,
   (d) spring means are provided, connected between the positioning arms and the front and back walls of the block, to maintain a predetermined angular positioning of the block.

4. A device as in claim 3, wherein:
   (a) the pivotal axis of the cylinder on the support plate is vertically and horizontally displaced and separate from the pivotal axis of the drive devices on the plate,
   (b) the pivotal axis of the drive rod on the block is displaced vertically and horizontally and separate from the pivotal axis of the drive devices on the block.

5. A device as in claim 1, wherein:
   (a) the wheel block is hollow and has a pair of partitions providing a middle chamber,
   (b) the drive rod and air cylinder are partially contained in said middle chamber when the block is in raised, inoperative position.

6. A device as in claim 1, wherein:
   (a) the wheel block is hollow and has a back wall disposed opposite the concave wheel contact plate, said back wall having a recess in its upper portion to receive the drive rod, said recessed wall limiting the relative movement between the rod and block.

7. A wheel block shoe construction for preventing undesired rolling of a parked vehicle, comprising in combination:
   (a) a hollow wheel block engageable with the vehicle wheel,
   (b) an actuator rod extending into the block and pivotally connected thereto,
   (c) a positioning arm located within and spaced from the walls of the block, said arm being rigidly connected and affixed to the actuator rod and being disposed at one side thereof,
   (d) power means connected to the rod to shift the same for the purpose of moving the block with respect to the vehicle wheel, and
   (e) a pair of resilient means connected respectively between opposite sides of the lateral arm affixed to the actuator rod and the block, tending to maintain the latter in a given rotary position with respect to the rod, said means yielding upon engagement of the block with the wheel to enable the block to conform its position to that of the wheel.

8. A device as in claim 7, wherein:
   (a) the arm connected to the actuator rod is joined to the bottom of the rod and extends upward into the block,
   (b) said resilient means comprising separate coil springs engaged with opposite sides of the arm and with the block to yieldably hold the arm in a centralized rotative position in the block.

9. A device as in claim 7, wherein:
   (a) a second actuator rod is provided, extending into the block, said second rod being pivotally connected thereto at a place removed from the pivotal connection of the first rod,
   (b) separate power means are provided, connected to the second actuator rod to shift the same for the purpose of moving the wheel block,
   (c) said resilient means tending to maintain the said given position of the block when either the second or the first-mentioned rod imposes a drag on the block during movement of the latter.

10. A device as in claim 9, wherein:
    (a) a third actuator rod is provided, extending into the block, said third rod being pivotally connected thereto along the axis of the pivotal connection of the second rod but spaced therefrom,
    (b) separate power means are provided, connected to the third rod to shift the same for the purpose of moving the wheel block, (c) said resilient means tending to maintain the said given position of the block when any of the rods imposes a drag on the block during the movement of the latter, and tending to assist the dragging rod.

11. A device as in claim 10, wherein:

(a) the first-mentioned actuator rod is centrally disposed in the block and the second and third actuator rods are symmetrically located on opposite sides of the first-mentioned actuator rod.

12. A device as in claim 11, wherein:

(a) there is an additional positioning arm within the block, said arms being disposed on opposite sides of the first-mentioned rod and both said arms being connected to the bottom of and being rigid with the said actuator rod, and (b) coil springs engaged with opposite sides of the additional arm and with the block to yieldably hold the additional arm in centralized position in the block.

References Cited by the Examiner

UNITED STATES PATENTS

| | | | |
|---|---|---|---|
| 1,801,809 | 4/31 | Fyfe | 188—4 |
| 2,344,902 | 3/44 | Sexton | 303—20 |
| 2,687,191 | 8/54 | Shannon | 188—5 X |
| 2,732,035 | 1/56 | Besoyan | 188—4 |
| 2,957,549 | 10/60 | Nesselberger | 188—4 |
| 3,086,619 | 4/63 | Grotz | 188—4 |

ARTHUR L. LA POINT, *Primary Examiner.*

DUANE A. REGER, *Examiner.*